(12) United States Patent
Mathew et al.

(10) Patent No.: US 12,368,657 B2
(45) Date of Patent: Jul. 22, 2025

(54) SYSTEMS AND METHODS FOR MONITORING PERFORMANCE OF A NETWORK SLICE AND MITIGATING LOAD ON THE NETWORK SLICE

(71) Applicant: Verizon Patent and Licensing Inc., Basking Ridge, NJ (US)

(72) Inventors: James Mathew, Belle Mead, NJ (US); Peretz Feder, Englewood, NJ (US); Mourad B. Takla, Hillsborough, NJ (US); Sachin Vargantwar, Cumming, GA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 453 days.

(21) Appl. No.: 17/809,065

(22) Filed: Jun. 27, 2022

(65) Prior Publication Data
US 2023/0421472 A1  Dec. 28, 2023

(51) Int. Cl.
| | |
|---|---|
| H04L 43/087 | (2022.01) |
| H04L 41/0895 | (2022.01) |
| H04L 43/0888 | (2022.01) |
| H04L 47/125 | (2022.01) |
| H04L 47/28 | (2022.01) |

(52) U.S. Cl.
CPC ........ *H04L 43/087* (2013.01); *H04L 43/0888* (2013.01); *H04L 47/125* (2013.01); *H04L 47/28* (2013.01)

(58) Field of Classification Search
CPC . H04L 43/087; H04L 43/0888; H04L 47/125; H04L 47/28
See application file for complete search history.

(56) References Cited

U.S. PATENT DOCUMENTS

| | | | | |
|---|---|---|---|---|
| 2015/0373648 | A1* | 12/2015 | Yang | H04W 52/146 455/522 |
| 2021/0112428 | A1* | 4/2021 | Young | H04W 76/11 |
| 2021/0160897 | A1* | 5/2021 | Young | H04W 28/24 |

(Continued)

OTHER PUBLICATIONS

GSM Association, "Generic Network Slice Template, Version 5.0," Jun. 1, 2021, 68 Pages.

(Continued)

*Primary Examiner* — Xuan Lu

(57) ABSTRACT

A device may receive network data identifying uplink/downlink packet loss percentage, uplink/downlink jitter, uplink/downlink latency, and uplink/downlink packet throughput associated with a slice of a network, and may set an uplink value for each of the uplink packet loss percentage, the uplink jitter, the uplink latency, and the uplink packet throughput. The device may multiply the uplink values by corresponding uplink weights to calculate an uplink cost, and may set a downlink value for each of the downlink packet loss percentage, the downlink jitter, the downlink latency, and the downlink packet throughput. The device may multiply the downlink values by corresponding downlink weights to calculate a downlink cost, and may calculate a total cost based on the uplink cost and the downlink cost. The device may cause another slice, with the same attributes as the slice, to be instantiated when the total cost satisfies a threshold for a time period.

20 Claims, 11 Drawing Sheets

(56) References Cited

U.S. PATENT DOCUMENTS

| | | | | |
|---|---|---|---|---|
| 2021/0345454 A1* | 11/2021 | Dhanapal | .............. | H04W 76/27 |
| 2022/0159605 A1* | 5/2022 | Li | ........................... | H04L 67/34 |
| 2022/0417799 A1* | 12/2022 | Schnitzler | ........... | H04L 41/5003 |
| 2023/0246900 A1* | 8/2023 | Zhang | ................... | H04L 41/342 |
| | | | | 709/223 |

OTHER PUBLICATIONS

GSM Association, "E2E Network Slicing Architecture, Version 1.0," Jun. 3, 2021, 48 Pages.

3GPP 5G, ETSI TS 128 530 V16.2.0, "5G; Management and' orchestration; Concepts, use cases and requirements (3GPP TS 28.530 version 16.2.0 Release 16)," Aug. 2020, 33 Pages.

\* cited by examiner

SYSTEMS AND METHODS FOR MONITORING PERFORMANCE OF A NETWORK SLICE AND MITIGATING LOAD ON THE NETWORK SLICE

BACKGROUND

A user equipment (UE) may utilize slices of a wireless network (e.g., a radio access network (RAN)) to attach to slices of a core fifth-generation (5G) network. A UE may utilize the RAN and the core network to transmit traffic to other UEs or other wireless or wireline devices and/or to receive traffic from the other UEs or the other wireless or wireline devices.

DETAILED DESCRIPTION OF EXAMPLE EMBODIMENTS

Figure 1A:
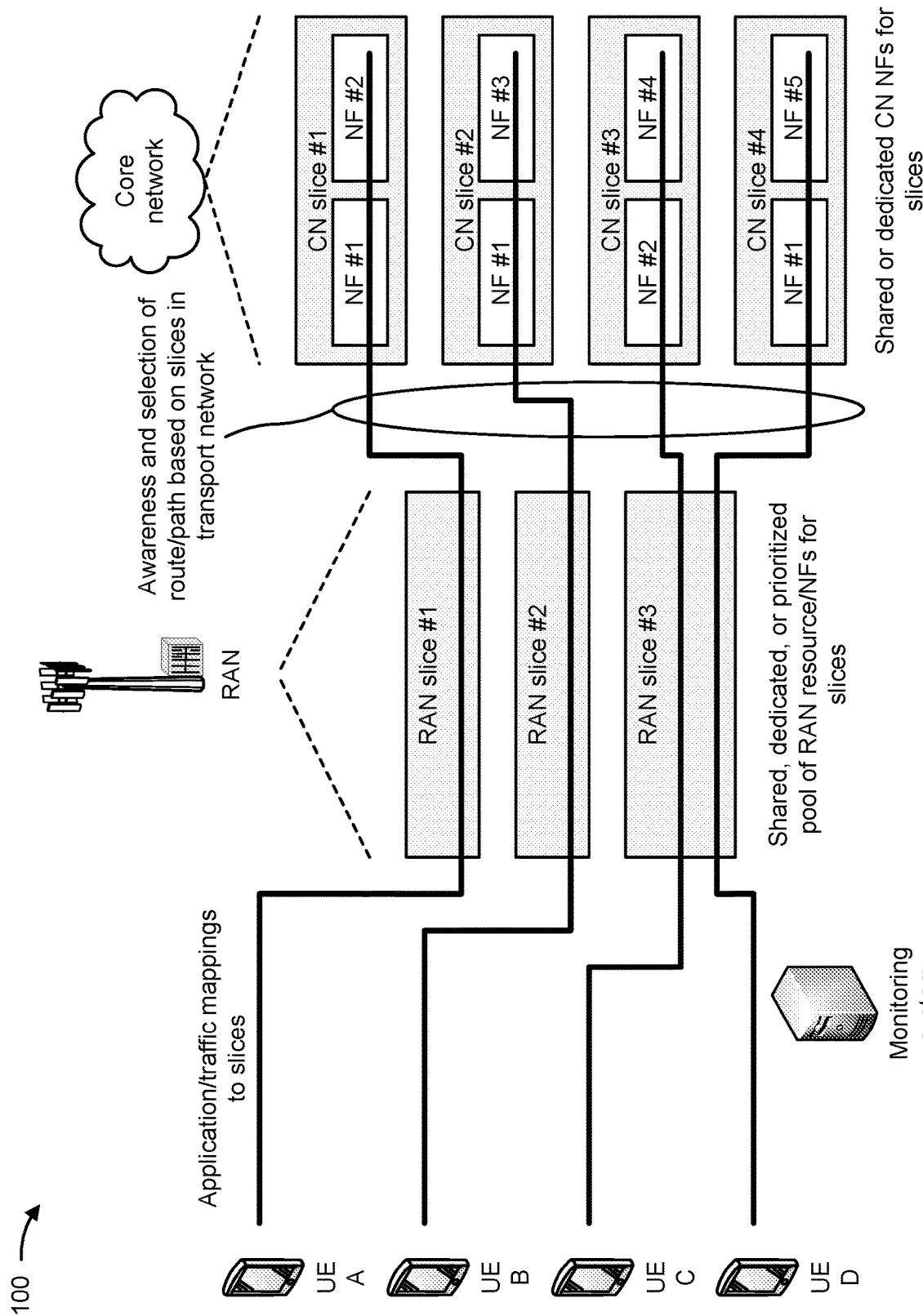
FIGS. 1A-1G are diagrams of an example associated with monitoring performance of a network slice and mitigating load on the network slice.

The following detailed description of example implementations refers to the accompanying drawings. The same reference numbers in different drawings may identify the same or similar elements.

Network slicing is the ability to implement multiple end-to-end isolated logical networks (slices) and achieve optimized benefits in each logical network based on business, technical, and operational objectives. Current industry standards request slice monitoring functions with standardized attributes for slice performance related to allowed data rate aggregation of a slice and determining a quantity of protocol data unit (PDU) sessions allowed per slice in order to maintain acceptable user experience of all the slice users given a specific service level agreement. However, current standards fail to define how to monitor slices and how to manage load on slices. Thus, current mechanisms for monitoring slices and managing load on slices consume computing resources (e.g., processing resources, memory resources, communication resources, and/or the like), networking resources, and/or other resources associated with inaccurately monitoring slices, inaccurately managing load on slices, instantiating additional slices based on inaccurate slice monitoring results or based inaccurate slice load management, losing traffic due to inaccurate slice monitoring results or inaccurate slice load management, and/or the like.

Some implementations described herein provide a monitoring system that monitors performance of a network slice and mitigates load on the network slice. For example, the monitoring system may receive network data identifying uplink packet loss percentage, uplink jitter, uplink latency, uplink packet throughput, downlink packet loss percentage, downlink jitter, downlink latency, and downlink packet throughput associated with a slice of a network, and may set an uplink value for each of the uplink packet loss percentage, the uplink jitter, the uplink latency, and the uplink packet throughput to generate a plurality of uplink values. The monitoring system may multiply the plurality of uplink values by corresponding uplink weights to calculate an uplink cost, and may set a downlink value for each of the downlink packet loss percentage, the downlink jitter, the downlink latency, and the downlink packet throughput to generate a plurality of downlink values. The monitoring system may multiply the plurality of downlink values by corresponding downlink weights to calculate a downlink cost, and may calculate a total cost based on the uplink cost and the downlink cost. The monitoring system may determine whether the total cost satisfies a threshold for a time period, and may cause another slice or slice instance, with the same attributes as the slice, to be instantiated, switch the user to another slice or slice instance with less attributes as the slice (e.g., a slice with more relaxed cost requirements), or reject an incoming user based on the total cost satisfying the threshold for the time period.

In this way, the monitoring system monitors performance of a network slice at multiple points and mitigates load on the network slice within the different network elements comprising the slice. For example, the monitoring system may monitor slice loading conditions that trigger a slice load balancing model. The slice load balance model may cause a core network to redirect registration of incoming UEs and PDU sessions to one or more alternate slices or to instantiate additional slices or slice instances (e.g., with the same attributes as a slice in use or with less attributes as the slice in use) to accommodate additional incoming PDU sessions requesting access to the slice. The monitoring system may determine slice performance based on packet loss percentage, jitter, latency, and packet throughput in an uplink direction and a downlink direction. Thus, the monitoring system may conserve computing resources, networking resources, and/or other resources that would otherwise have been consumed in inaccurately monitoring slices, inaccurately managing load on slices, instantiating additional slices based on inaccurate slice monitoring results or based inaccurate slice load management, losing traffic due to inaccurate slice monitoring results or inaccurate slice load management, and/or the like.

FIGS. 1A-1G are diagrams of an example 100 associated with identifying and correcting issues associated with a wireless network. As shown in FIGS. 1A-1G, example 100 includes a plurality of UEs, a RAN, a core network, and a monitoring system 105. Further details of the plurality of UEs, the RAN, the core network, and the monitoring system 105 are provided elsewhere herein.

As shown in FIG. 1A, the plurality of UEs (e.g., UE A, UE B, UE C, and UE D) may utilize applications, transmit and/or receive traffic, and/or the like via the RAN, a transport network, and the core network. The RAN may include a shared, dedicated, and/or prioritized pool of RAN computing resources and/or network functions (NFs) for RAN slices (e.g., RAN slice #1, RAN slice #2, RAN slice #3, and/or the like). The core network (CN) may include shared and/or dedicated network functions for core network slices. For example, a first core network slice (e.g., CN slice #1) may include first and second network functions (e.g., NF #1 and NF #2), a second core network slice (e.g., CN slice #2) may include first and third network functions (e.g., NF #1 and NF #3), a third core network slice (e.g., CN slice #3) may include second and fourth network functions (e.g., NF #2 and NF #4), a fourth core network slice (e.g., CN slice #4) may include first and fifth network functions (e.g., NF #1 and NF #5), and/or the like. The plurality of UEs may utilize application and/or traffic mappings to the RAN slices and/or the core network slices in order to utilize the applications, transmit and/or receive the traffic, and/or the like. As further shown in FIG. 1A, the RAN and/or the core network may be aware of and/or select routes and/or paths based on the slices in a transport network connecting the RAN and the core network.

A network slice may be instantiated by allocating network functions (e.g., quantities of processing resources, memory resources, and/or the like) for the network slice. The network functions may be prepared for handling the network slice, and the network slice may be created via the network functions. The network slice may be activated and utilized (e.g., by the UEs). The performance of the network slice may be monitored to generate service performance results, and the network slice utilization may be modified based on the results. Eventually, the non-performing network slice may be deactivated and terminated so that the network function resources may be reallocated to another network slice.

Figure 1B:
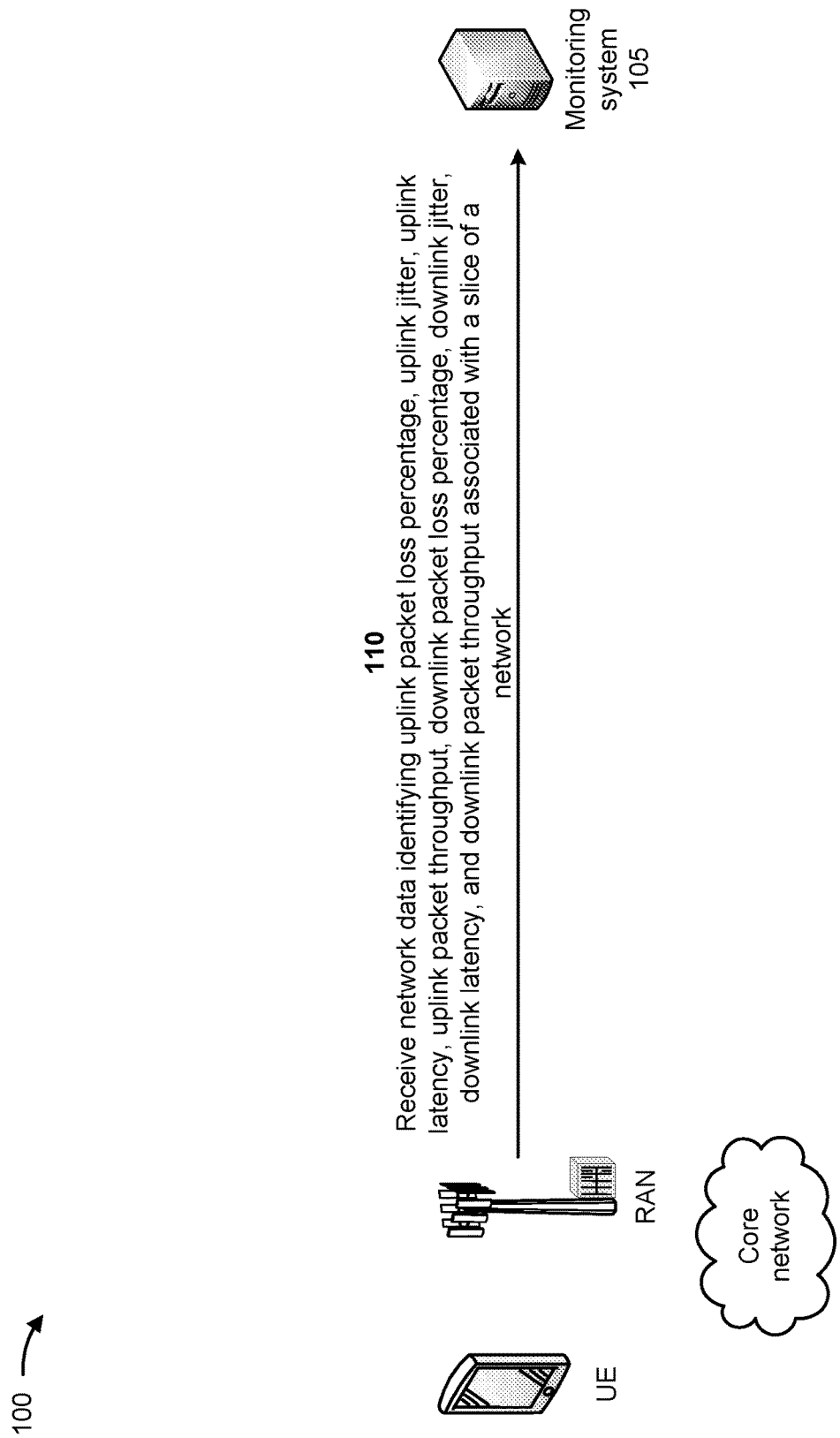

As shown in FIG. 1B, and by reference number 110, the monitoring system 105 may receive network data identifying uplink packet loss percentage, uplink jitter, uplink latency, uplink packet throughput, downlink packet loss percentage, downlink jitter, downlink latency, and downlink packet throughput associated with a slice of a network (e.g., the RAN, the transport network, and/or the core network). For example, the UE may communicate with the RAN and/or the core network via an uplink and a downlink. The uplink may include a signal transmitted from the UE to the RAN, and the downlink may include a signal transmitted from the RAN to the UE. The uplink may experience uplink packet loss characterized at various percentage levels (e.g., a loss of packets transmitted from the UE to the RAN), uplink jitter (e.g., a difference in latency between a packet flow from the UE to the RAN), uplink latency (e.g., a quantity of time for a packet to be transmitted from the UE to the RAN), and uplink packet throughput (e.g., a quantity of packets transmitted from the UE to the RAN within a predetermined time period). The downlink may experience downlink packet loss characterized at various percentage levels (e.g., a loss of packets transmitted from the RAN to the UE), downlink jitter (e.g., a difference in latency between a packet flow from the RAN to the UE), downlink latency (e.g., a quantity of time for a packet to be transmitted from the RAN to the UE), and downlink packet throughput (e.g., a quantity of packets transmitted from the RAN to the UE within a predetermined time period).

The UE and/or the RAN may calculate the network data identifying the uplink packet loss percentage, the uplink jitter, the uplink latency, the uplink packet throughput, the downlink packet loss percentage, the downlink jitter, the downlink latency, and the downlink packet throughput. The UE and/or the RAN may provide, to the monitoring system 105, the network data identifying the uplink packet loss percentage, the uplink jitter, the uplink latency, the uplink packet throughput, the downlink packet loss percentage, the downlink jitter, the downlink latency, and the downlink packet throughput, and the monitoring system 105 may receive the network data. In some implementations, the monitoring system 105 may periodically receive the network data, may continuously receive the network data, and/or the like. In some implementations, the monitoring system 105 may utilize the network data to evaluate slice loading conditions that can trigger a slice load balancing model. The slice load balance model may cause the core network to redirect registration of incoming UEs and PDU sessions to one or more alternate slices, reject registration of incoming UEs or, alternatively, to instantiate additional slices or slice instances (e.g., with the same attributes as the slice or with less attributes as the slice) to accommodate additional incoming PDU sessions requesting access to the slice.

Figure 1C:
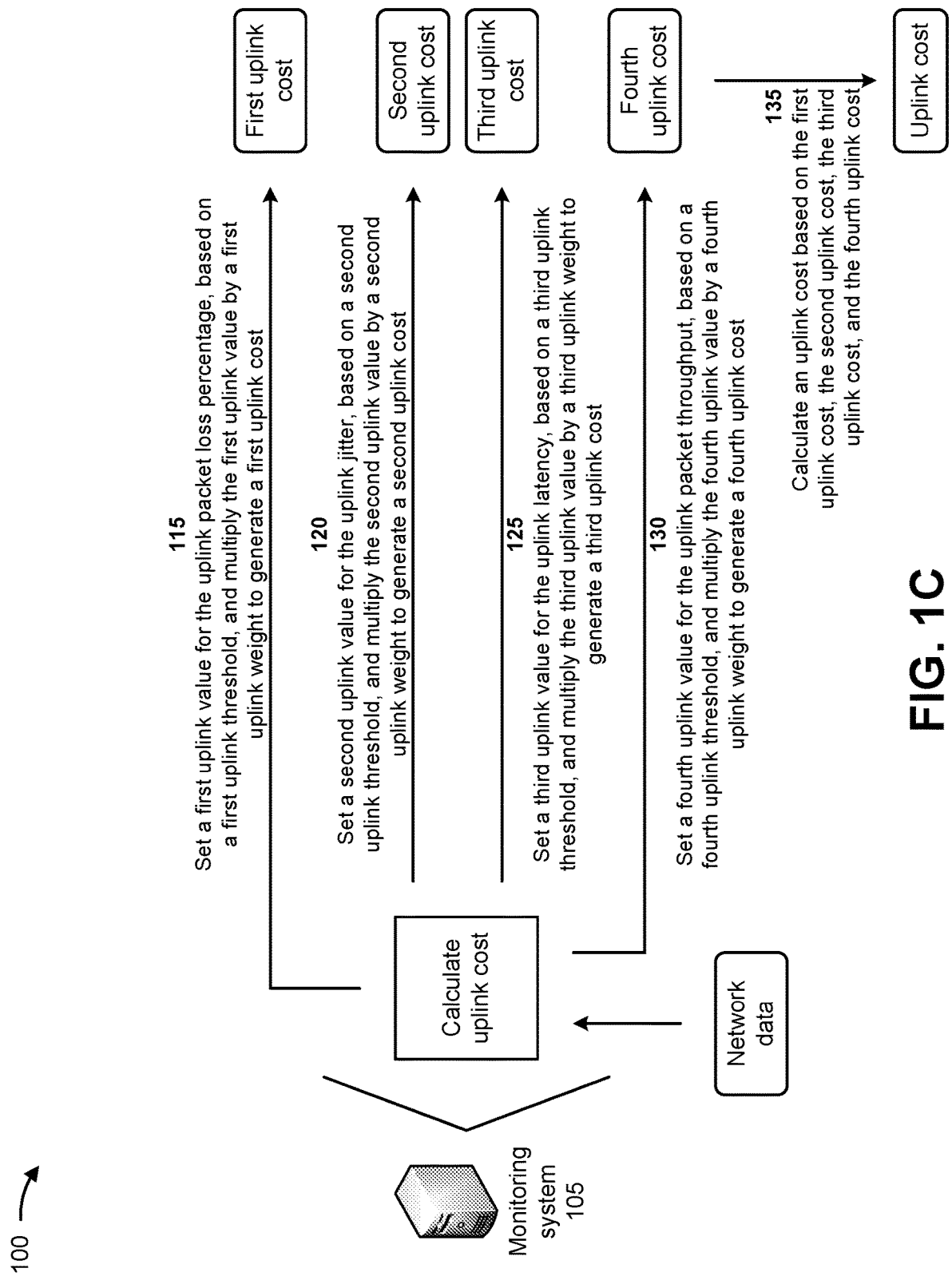

As shown in FIG. 1C, and by reference number 115, the monitoring system 105 may set a first uplink value for the uplink packet loss percentage, based on a first uplink threshold, and may multiply the first uplink value by a first uplink weight to generate a first uplink cost. For example, the monitoring system 105 may utilize a cost model to monitor a performance of a slice in the network. In some implementations, the monitoring system 105 may utilize the cost model to set the first uplink value to one (1) when the uplink packet loss percentage is less than the first uplink threshold. Alternatively, the monitoring system 105 may utilize the cost model to set the first uplink value to zero (0) when the uplink packet loss percentage is greater than or equal to the first uplink threshold. The monitoring system 105 may utilize the cost model to multiply the first uplink value (e.g., one or zero) by the first uplink weight (e.g., a number less than one) to generate the first uplink cost.

As further shown in FIG. 1C, and by reference number 120, the monitoring system 105 may set a second uplink value for the uplink jitter, based on a second uplink threshold, and may multiply the second uplink value by a second uplink weight to generate a second uplink cost. For example, the monitoring system 105 may utilize the cost model to set the second uplink value to one (1) when the uplink jitter is less than the second uplink threshold. Alternatively, the monitoring system 105 may utilize the cost model to set the second uplink value to zero (0) when the uplink jitter is greater than or equal to the second uplink threshold. The monitoring system 105 may utilize the cost model to multiply the second uplink value (e.g., one or zero) by the second uplink weight (e.g., a number less than one) to generate the second uplink cost.

As further shown in FIG. 1C, and by reference number 125, the monitoring system 105 may set a third uplink value for the uplink latency, based on a third uplink threshold, and may multiply the third uplink value by a third uplink weight to generate a third uplink cost. For example, the monitoring system 105 may utilize the cost model to set the third uplink value to one (1) when the uplink latency is less than the third uplink threshold. Alternatively, the monitoring system 105 may utilize the cost model to set the third uplink value to zero (0) when the uplink latency is greater than or equal to the third uplink threshold. The monitoring system 105 may utilize the cost model to multiply the third uplink value (e.g., one or zero) by the third uplink weight (e.g., a number less than one) to generate the third uplink cost.

As further shown in FIG. 1C, and by reference number 130, the monitoring system 105 may set a fourth uplink value for the uplink packet throughput, based on a fourth uplink threshold, and may multiply the fourth uplink value by a fourth uplink weight to generate a fourth uplink cost. For example, the monitoring system 105 may utilize the cost model to set the fourth uplink value to one (1) when the uplink packet throughput is less than the fourth uplink threshold. Alternatively, the monitoring system 105 may utilize the cost model to set the fourth uplink value to zero (0) when the uplink packet throughput is greater than or equal to the fourth uplink threshold. The monitoring system 105 may utilize the cost model to multiply the fourth uplink value (e.g., one or zero) by the fourth uplink weight (e.g., a number less than one) to generate the fourth uplink cost. In some implementations, the first uplink weight, the second uplink weight, the third uplink weight, and the fourth uplink weight may sum to one.

As further shown in FIG. 1C, and by reference number 135, the monitoring system 105 may calculate an uplink cost based on the first uplink cost, the second uplink cost, the third uplink cost, and the fourth uplink cost. For example, the monitoring system 105 may utilize the cost model to add the first uplink cost, the second uplink cost, the third uplink cost, and the fourth uplink cost together to calculate the uplink cost associated with the network slice. In some implementations, the cost model may calculate the uplink cost ($C_u$) as follows:

$C_u = u_1 *$ (1 if uplink packet loss percentage $< T_{u1}$, else 0) $+ u_2$
$*$ (1 if uplink jitter $< T_{u2}$, else 0) $+ u_3$
$*$ (1 if uplink latency $< T_{u3}$, else 0) $+ u_4$
$*$ (1 if uplink packet throughput $< T_{u4}$, else 0), where $u_1$ is the first uplink weight, $u_2$ is the second uplink weight, $u_3$ is the third uplink weight, $u_4$ is the fourth uplink weight, $T_{u1}$ is the first uplink threshold, $T_{u2}$ is the second uplink threshold, $T_{u3}$ is the third uplink threshold, and $T_{u4}$ is the fourth uplink threshold. In some implementations, the cost model may calculate the uplink cost based on additional parameters associated with performance of a network slice (e.g., historical uplink usage of the network slice).

Figure 1D:
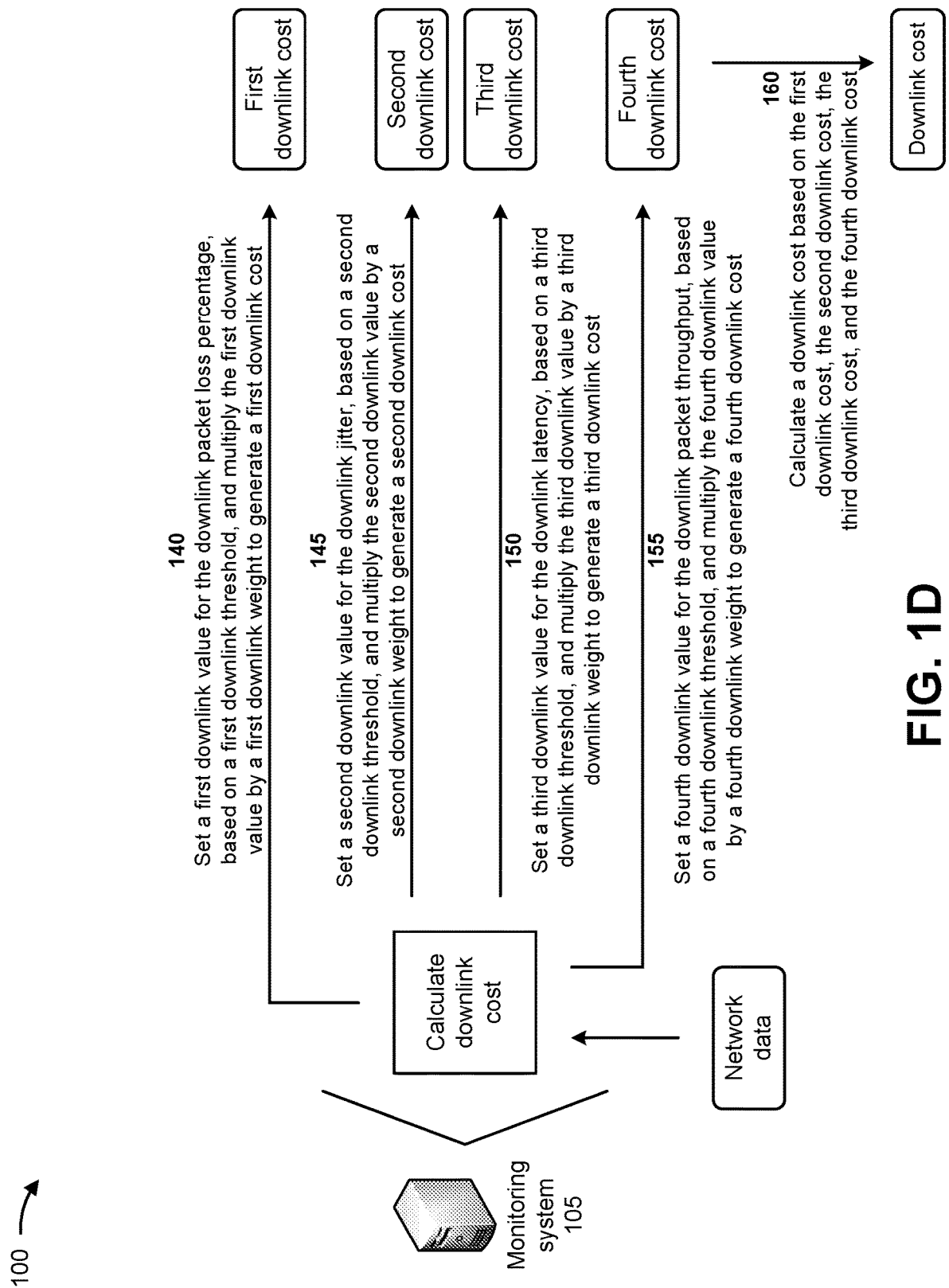

As shown in FIG. 1D, and by reference number 140, the monitoring system 105 may set a first downlink value for the downlink packet loss percentage, based on a first downlink threshold, and may multiply the first downlink value by a first downlink weight to generate a first downlink cost. For example, the monitoring system 105 may utilize the cost model to set the first downlink value to one (1) when the downlink packet loss percentage is less than the first downlink threshold. Alternatively, the monitoring system 105 may utilize the cost model to set the first downlink value to zero (0) when the downlink packet loss percentage is greater than or equal to the first downlink threshold. The monitoring system 105 may utilize the cost model to multiply the first downlink value (e.g., one or zero) by the first downlink weight (e.g., a number less than one) to generate the first downlink cost.

As further shown in FIG. 1D, and by reference number 145, the monitoring system 105 may set a second downlink value for the downlink jitter, based on a second downlink threshold, and may multiply the second downlink value by a second downlink weight to generate a second downlink cost. For example, the monitoring system 105 may utilize the cost model to set the second downlink value to one (1) when the downlink jitter is less than the second downlink threshold. Alternatively, the monitoring system 105 may utilize the cost model to set the second downlink value to zero (0) when the downlink jitter is greater than or equal to the second downlink threshold. The monitoring system 105 may utilize the cost model to multiply the second downlink value (e.g., one or zero) by the second downlink weight (e.g., a number less than one) to generate the second downlink cost.

As further shown in FIG. 1D, and by reference number 150, the monitoring system 105 may set a third downlink value for the downlink latency, based on a third downlink threshold, and may multiply the third downlink value by a third downlink weight to generate a third downlink cost. For example, the monitoring system 105 may utilize the cost model to set the third downlink value to one (1) when the downlink latency is less than the third downlink threshold. Alternatively, the monitoring system 105 may utilize the cost model to set the third downlink value to zero (0) when the downlink latency is greater than or equal to the third downlink threshold. The monitoring system 105 may utilize the cost model to multiply the third downlink value (e.g., one or zero) by the third downlink weight (e.g., a number less than one) to generate the third downlink cost.

As further shown in FIG. 1D, and by reference number 155, the monitoring system 105 may set a fourth downlink value for the downlink packet throughput, based on a fourth downlink threshold, and may multiply the fourth downlink value by a fourth downlink weight to generate a fourth downlink cost. For example, the monitoring system 105 may utilize the cost model to set the fourth downlink value to one (1) when the downlink packet throughput is less than the fourth downlink threshold. Alternatively, the monitoring system 105 may utilize the cost model to set the fourth downlink value to zero (0) when the downlink packet throughput is greater than or equal to the fourth downlink threshold. The monitoring system 105 may utilize the cost model to multiply the fourth downlink value (e.g., one or zero) by the fourth downlink weight (e.g., a number less than one) to generate the fourth downlink cost. In some implementations, the first downlink weight, the second downlink weight, the third downlink weight, and the fourth downlink weight may sum to one.

As further shown in FIG. 1D, and by reference number 160, the monitoring system 105 may calculate a downlink cost based on the first downlink cost, the second downlink cost, the third downlink cost, and the fourth downlink cost. For example, the monitoring system 105 may utilize the cost model to add the first downlink cost, the second downlink cost, the third downlink cost, and the downlink uplink cost together to calculate the downlink cost associated with the network slice. In some implementations, the cost model may calculate the downlink cost ($C_d$) as follows:

$C_d = d_1 *$ (1 if uplink packet loss percentage $< T_{d1}$, else 0) $+ d_2$
$*$ (1 if uplink jitter $< T_{d2}$, else 0) $+ d_3$
$*$ (1 if uplink latency $< T_{d3}$, else 0) $+ d_4$
$*$ (1 if uplink packet throughput $< T_{d4}$, else 0), where $d_1$ is the first downlink weight, $d_2$ is the second downlink weight, $d_3$ is the third downlink weight, $d_4$ is the fourth downlink weight, $T_{d1}$ is the first downlink threshold, $T_{d2}$ is the second downlink threshold, $T_{d3}$ is the third downlink threshold, and $T_{d4}$ is the fourth downlink threshold. In some implementations, the cost model may calculate the downlink cost based on additional parameters associated with performance of a network slice (e.g., historical downlink usage of the network slice).

Figure 1E:
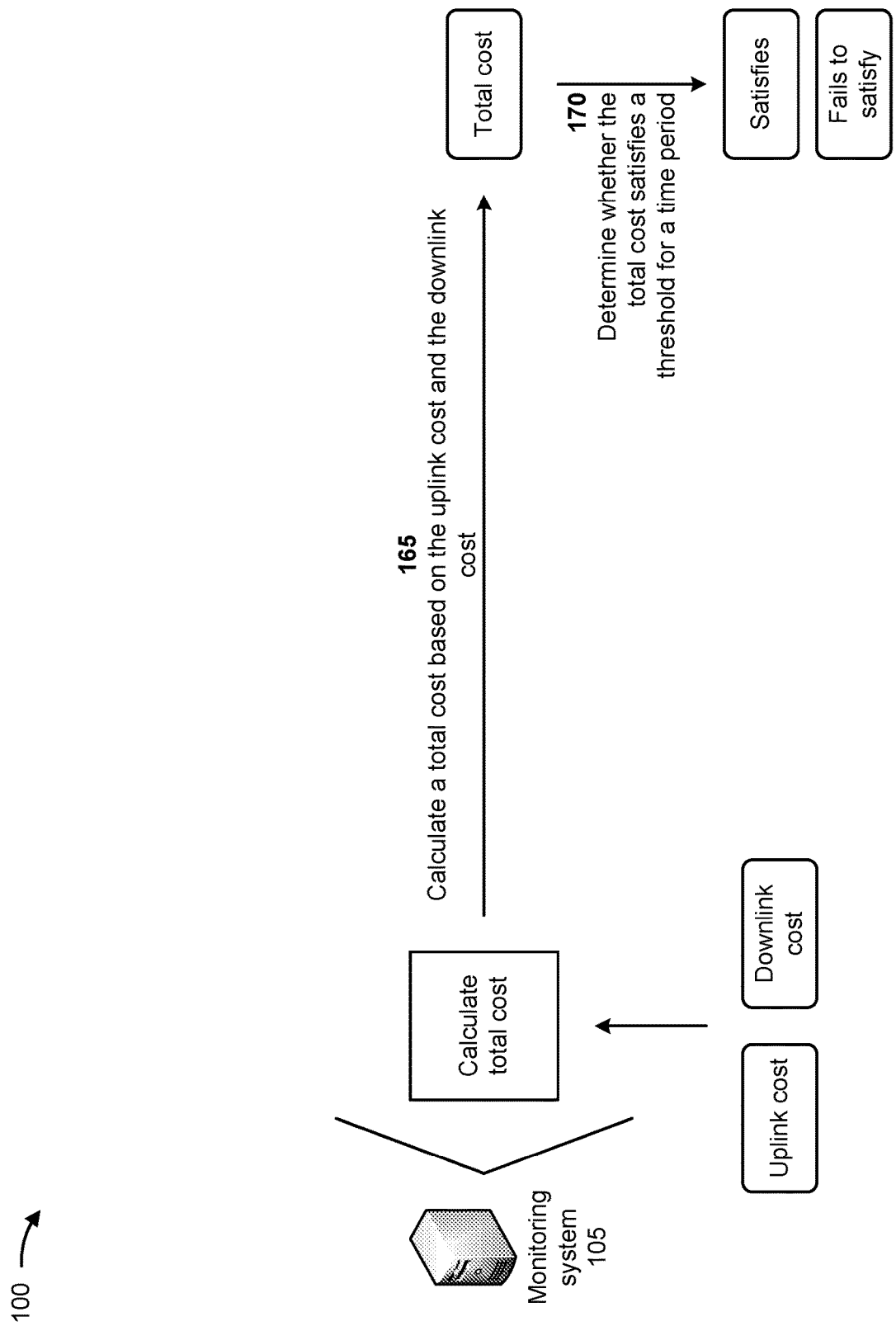

As shown in FIG. 1E, and by reference number 165, the monitoring system 105 may calculate a total cost based on the uplink cost and the downlink cost. For example, the monitoring system 105 may utilize the cost model to add the uplink cost and the downlink cost to calculate the total cost associated with the network slice. In some implementations, when calculating the total cost based on the uplink cost and the downlink cost, the monitoring system 105 may utilize the cost model to apply weights (e.g., that sum to one) to the uplink cost and the downlink cost to generate a weighted uplink cost and a weighted downlink cost. The monitoring system 105 may utilize the cost model to calculate the total cost based on the weighted uplink cost and the weighted downlink cost. For example, the monitoring system 105 may utilize the cost model to add the weighted uplink cost and the weighted downlink cost to calculate the total cost associated with the network slice.

In some implementations, the monitoring system 105 may utilize a machine learning model to tune thresholds and/or coefficients associated with the cost model. For example, the monitoring system 105 may process the plurality of uplink values and the corresponding uplink weights, with the machine learning model, to generate results that determine expected uplink values for a present time period and/or predicted uplink values for a future time period, and may modify one or more of the plurality of uplink values or the corresponding uplink weights based on the results. The results may include information indicating that one of the uplink values provides a better performance indicator for the network slice than the other uplink values. The monitoring system 105 may utilize such information to increase an uplink weight associated with the one of the uplink values. In another example, the monitoring system 105 may process the plurality of downlink values and the corresponding downlink weights, with the machine learning model, to generate results that determine expected downlink values for the present time period and/or predicted downlink values for the future time period, and may modify one or more of the plurality of downlink values or the corresponding downlink weights based on the results. The results may include information indicating that one of the downlink values provides a worse performance indicator for the network slice than the other downlink values. The monitoring system 105 may utilize such information to decrease a downlink weight associated with the one of the downlink values. In some implementations, the monitoring system 105 may periodically monitor the performance of the network slice with the cost model, may continuously monitor the performance of the network slice with the cost model, and/or the like.

As further shown in FIG. 1E, and by reference number 170, the monitoring system 105 may determine whether the total cost satisfies a threshold for a time period (e.g., which is tunable). For example, the monitoring system 105 may utilize the slice load balancing model to determine whether the total cost of the network slice satisfies the threshold for the time period. In some implementations, when the total cost of the network slice is less than the threshold for the time period, the monitoring system 105 may utilize the slice load balancing model to initiate an additional network slice or a network slice instance with the same slice attributes as the existing network slice. When the total cost of the network slice is greater than or equal to the threshold for the time period, the monitoring system 105 may not initiate the additional network slice or the network slice instance.

Figure 1F:
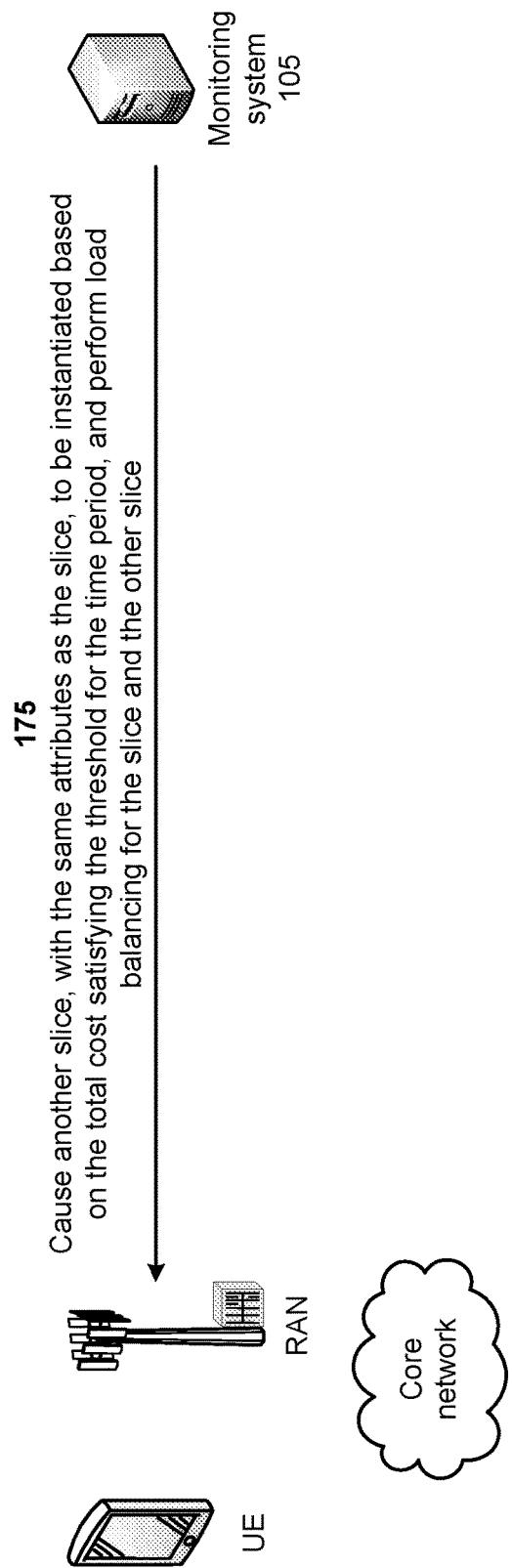

As shown in FIG. 1F, and by reference number 175, the monitoring system 105 may cause another slice or slide instance, with the same attributes as the slice, to be instantiated based on the total cost satisfying the threshold for the time period, and may perform load balancing for the slice and the other slice. For example, when the total cost of the network slice is less than the threshold for the time period, the monitoring system 105 may cause the network to instantiate the other slice or slice instance. In some implementations, the other slice may include the same attributes as the slice, may include different attributes than the slice, and/or the like. In some implementations, when the total cost of the network slice is less than the threshold for the time period, the monitoring system 115 may cause the network to instantiate another slice or slice instance with less attributes as the slice (e.g., a slice with more relaxed cost requirements) and move the UE to it. Moving and/or redirecting a UE to a slice with a different service level agreement (SLA) (e.g., an SLA for a lower cost slice) or to a default slice may not be desired, but may be a better alternative, if available, than rejecting a UE altogether.

If another network slice is instantiated, the monitoring system 105 may utilize the slice load balancing model to perform load balancing for incoming UEs and PDU sessions so that the UEs and the PDU sessions are distributed across the available network slice and the additional network slice based on the cost model evaluating performances of the network slice and the additional network slice. In some implementations, when performing the load balancing, the monitoring system 105 may utilize the slice load balancing model to cause the network to include the additional network slice in a list of allowed and preferred network slices that is to be provided to UEs registering with the network. In some implementations, when performing the load balancing, the monitoring system 105 may utilize the slice load balancing model to mitigate congestion on a congested slice by throughput throttling heavy users (e.g., UEs) via the core network or via redirection to another network slice. In some implementations, when performing the load balancing, the monitoring system 105 may process UE characteristics, with a machine learning model, to determine one or more load balancing actions (e.g., add a new network slice, move to another network slice, and/or the like).

Figure 1G:
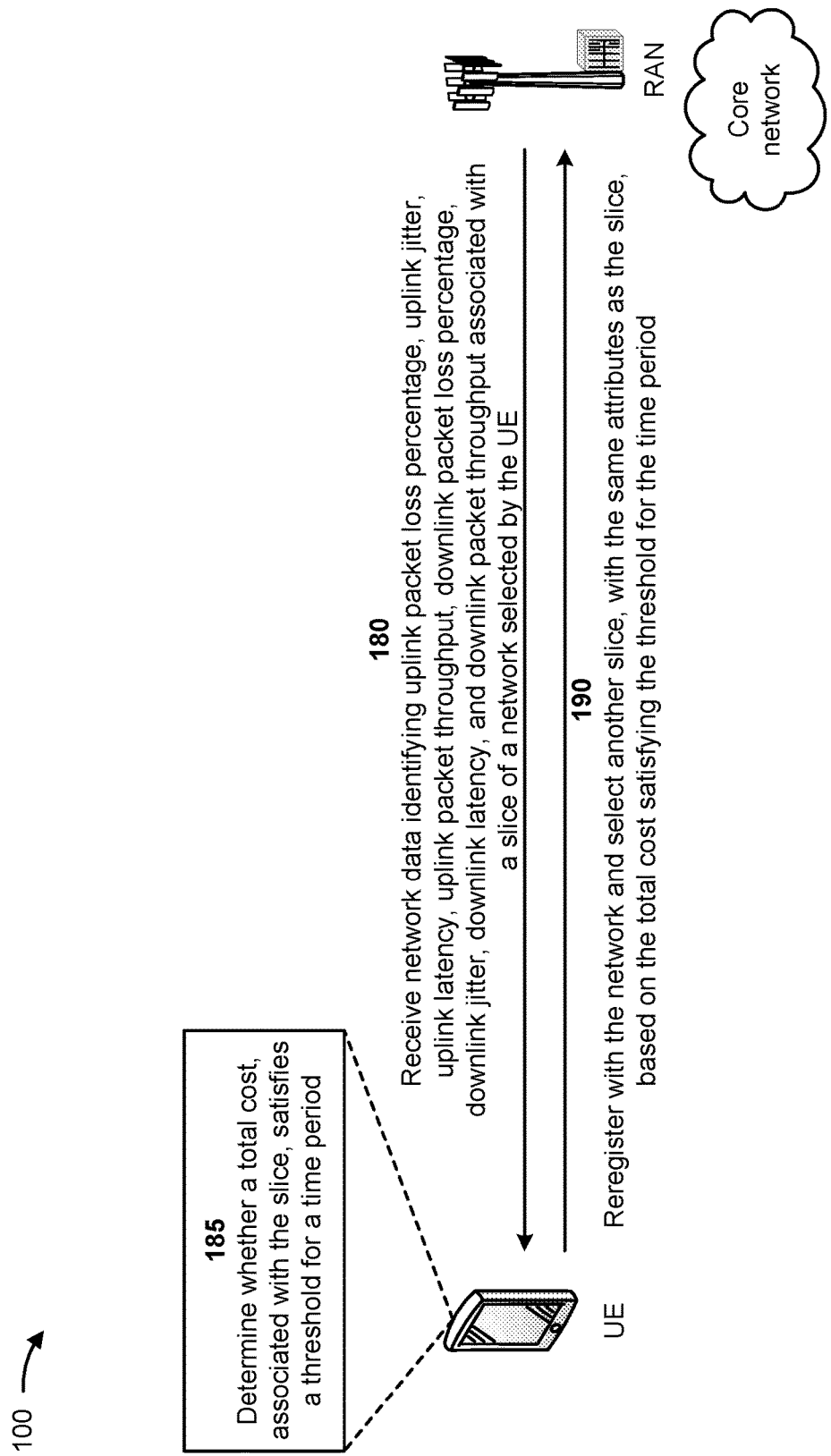

As shown in FIG. 1G, and by reference number 180, the UE may receive network data identifying uplink packet loss percentage, uplink jitter, uplink latency, uplink packet throughput, downlink packet loss percentage, downlink jitter, downlink latency, and downlink packet throughput associated with a slice of a network (e.g., the RAN and/or the core network) selected by the UE. For example, the RAN and/or the core network may calculate the network data identifying the uplink packet loss percentage, the uplink jitter, the uplink latency, the uplink packet throughput, the downlink packet loss percentage, the downlink jitter, the downlink latency, and the downlink packet throughput. The RAN may provide, to the UE, the network data identifying the uplink packet loss percentage, the uplink jitter, the uplink latency, the uplink packet throughput, the downlink packet loss percentage, the downlink jitter, the downlink latency, and the downlink packet throughput, and the UE may receive the network data. In some implementations, the UE may periodically receive the network data, may continuously receive the network data, and/or the like. In some implementations, the UE may utilize the network data to evaluate slice loading conditions that can trigger a slice load balancing model. The slice load balance model may cause the core network to redirect registration of incoming UEs and PDU sessions to one or more alternate slices, to instantiate additional slices to accommodate additional incoming PDU sessions requesting access to the slice, to reject UEs and PDU sessions, and/or the like.

As further shown in FIG. 1G, and by reference number 185, the UE may determine whether a total cost, associated with the slice, satisfies a threshold for a time period. For example, the UE may utilize the cost model to monitor a performance of a slice in a network. In some implementations, the monitoring system 105 may utilize the cost model to calculate the total cost of the slice, as described above in connection with FIGS. 1C-1E. The UE may utilize the slice load balancing model to determine whether the total cost of the network slice satisfies the threshold for the time period. In some implementations, when the total cost of the network slice is less than the threshold for the time period, the UE may reregister with the network and may select another slice, with the same attributes as the slice. When the total cost of the network slice is greater than or equal to the threshold for the time period, the UE may continue to utilize the slice and may not reregister with the network.

As further shown in FIG. 1G, and by reference number 190, the UE may reregister with the network and may select another slice, with the same attributes as the slice (or with less attributes as the slice), based on the total cost satisfying the threshold for the time period. For example, when the total cost of the network slice is less than the threshold for the time period, the UE may reregister with the network and may select another slice. In some implementations, the other slice may include the same attributes as the slice, may include different attributes than the slice, and/or the like. In some implementations, the UE may monitor the performance of the other slice and may reregister with the network and select still another slice when the total cost of the other slice satisfies the threshold for the time period.

Alternatively, or additionally, the UE may calculate the network data instead of receiving the network data from the core network. The UE may process the network data as described above for the monitoring system 105, and may select an alternate slice from slices authorized for use by the UE (e.g., instead of instantiating a new slice).

In this way, the monitoring system 105 monitors performance of a network slice and mitigates load on the network slice. For example, the monitoring system 105 may monitor slice loading conditions that trigger a slice load balancing model. The slice load balance model may cause a core network to reject and redirect registration of incoming UEs and PDU sessions to one or more alternate slices or to instantiate additional slices or slice instances (e.g., with the same attributes as a slice in use) to accommodate additional incoming PDU sessions requesting access to the slice. The monitoring system 105 may determine slice performance based on packet loss percentage, jitter, latency, and packet throughput in an uplink direction and a downlink direction. Thus, the monitoring system 105 may conserve computing resources, networking resources, and/or other resources that would otherwise have been consumed in inaccurately monitoring slices, inaccurately managing load on slices, instantiating additional slices based on inaccurate slice monitoring results or based inaccurate slice load management, losing traffic due to inaccurate slice monitoring results or inaccurate slice load management, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
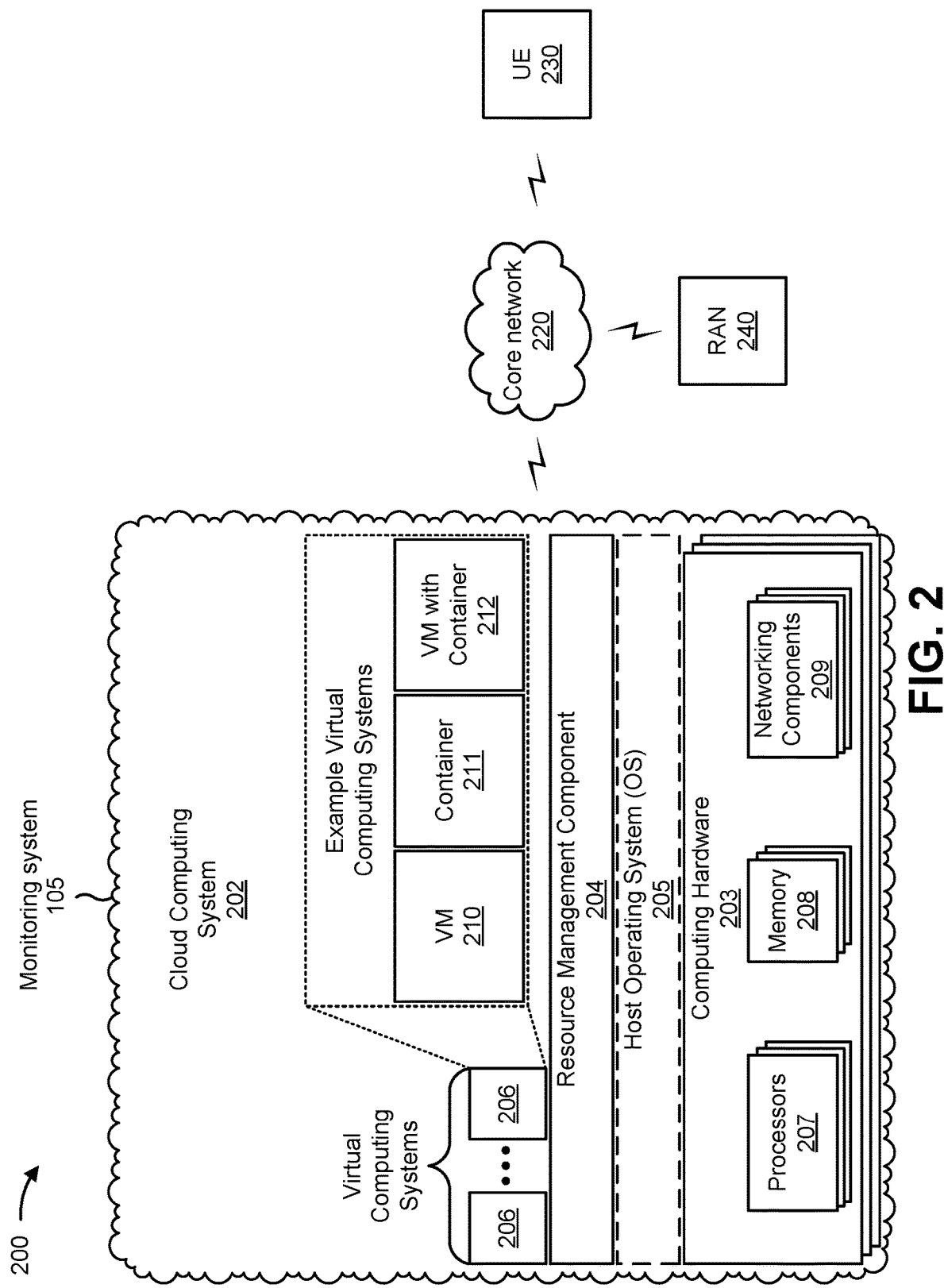
FIGS. 2 and 3 are diagrams of example environments in which systems and/or methods described herein may be implemented.

FIG. 2 is a diagram of an example environment 200 in which systems and/or methods described herein may be implemented. As shown in FIG. 2, the environment 200 may include the monitoring system 105, which may include one or more elements of and/or may execute within a cloud computing system 202. The cloud computing system 202 may include one or more elements 203-212, as described in more detail below. As further shown in FIG. 2, the environment 200 may include a core network 220, a UE 230, and/or a RAN 240. Devices and/or elements of the environment 200 may interconnect via wired connections and/or wireless connections.

The cloud computing system 202 includes computing hardware 203, a resource management component 204, a host operating system (OS) 205, and/or one or more virtual computing systems 206. The cloud computing system 202 may execute on, for example, an Amazon Web Services platform, a Microsoft Azure platform, or a Snowflake platform. The resource management component 204 may perform virtualization (e.g., abstraction) of the computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from the computing hardware 203 of the single computing device. In this way, the computing hardware 203 can operate more efficiently, with lower power consumption, higher reliability, higher availability, higher utilization, greater flexibility, and lower cost than using separate computing devices.

The computing hardware 203 includes hardware and corresponding resources from one or more computing devices. For example, the computing hardware 203 may include hardware from a single computing device (e.g., a single server) or from multiple computing devices (e.g., multiple servers), such as multiple computing devices in one or more data centers. As shown, the computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as the computing hardware 203) capable of virtualizing the computing hardware 203 to start, stop, and/or manage the one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211. In some implementations, the resource management component 204 executes within and/or in coordination with a host operating system 205.

A virtual computing system 206 includes a virtual environment that enables cloud-based execution of operations and/or processes described herein using the computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the monitoring system 105 may include one or more elements 203-212 of the cloud computing system 202, may execute within the cloud computing system 202, and/or may be hosted within the cloud computing system 202, in some implementations, the monitoring system 105 may not be cloud-based (e.g., may be implemented outside of a cloud computing system) or may be partially cloud-based. For example, the monitoring system 105 may include one or more devices that are not part of the cloud computing system 202, such as a device 400 of FIG. 4, which may include a standalone server or another type of computing device. The monitoring system 105 may perform one or more operations and/or processes described in more detail elsewhere herein.

The core network 220 includes one or more wired and/or wireless networks. For example, the core network 220 may include a cellular network, a public land mobile network (PLMN), a local area network (LAN), a wide area network (WAN), a local area data network (LADN), a private network, the Internet, and/or a combination of these or other types of networks. The core network 220 enables communication among the devices of the environment 200. Further details of the core network are provided below in connection with FIG. 3.

The UE 230 includes one or more devices capable of receiving, generating, storing, processing, and/or providing information, such as information described herein. For example, the UE 230 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The RAN 240 may support, for example, a cellular radio access technology (RAT). The RAN 240 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the UE 230. The RAN 240 may transfer traffic between the UE 230 (e.g., using a cellular RAT), one or more base stations (e.g., using a wireless interface or a backhaul interface, such as a wired backhaul interface), and/or a core network. The RAN 240 may provide one or more cells that cover geographic areas.

In some implementations, the RAN 240 may perform scheduling and/or resource management for the UE 230 covered by the RAN 240 (e.g., the UE 230 covered by a cell provided by the RAN 240). In some implementations, the RAN 240 may be controlled or coordinated by a network controller, which may perform load balancing, network-level configuration, and/or other operations. The network controller may communicate with the RAN 240 via a wireless or wireline backhaul. In some implementations, the RAN 240 may include a network controller, a self-organizing network (SON) module or component, or a similar module or component. In other words, the RAN 240 may perform network control, scheduling, and/or network management functions (e.g., for uplink, downlink, and/or sidelink communications of the UE 230 covered by the RAN 240).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the environment 200 may perform one or more functions described as being performed by another set of devices of the environment 200.

Figure 3:
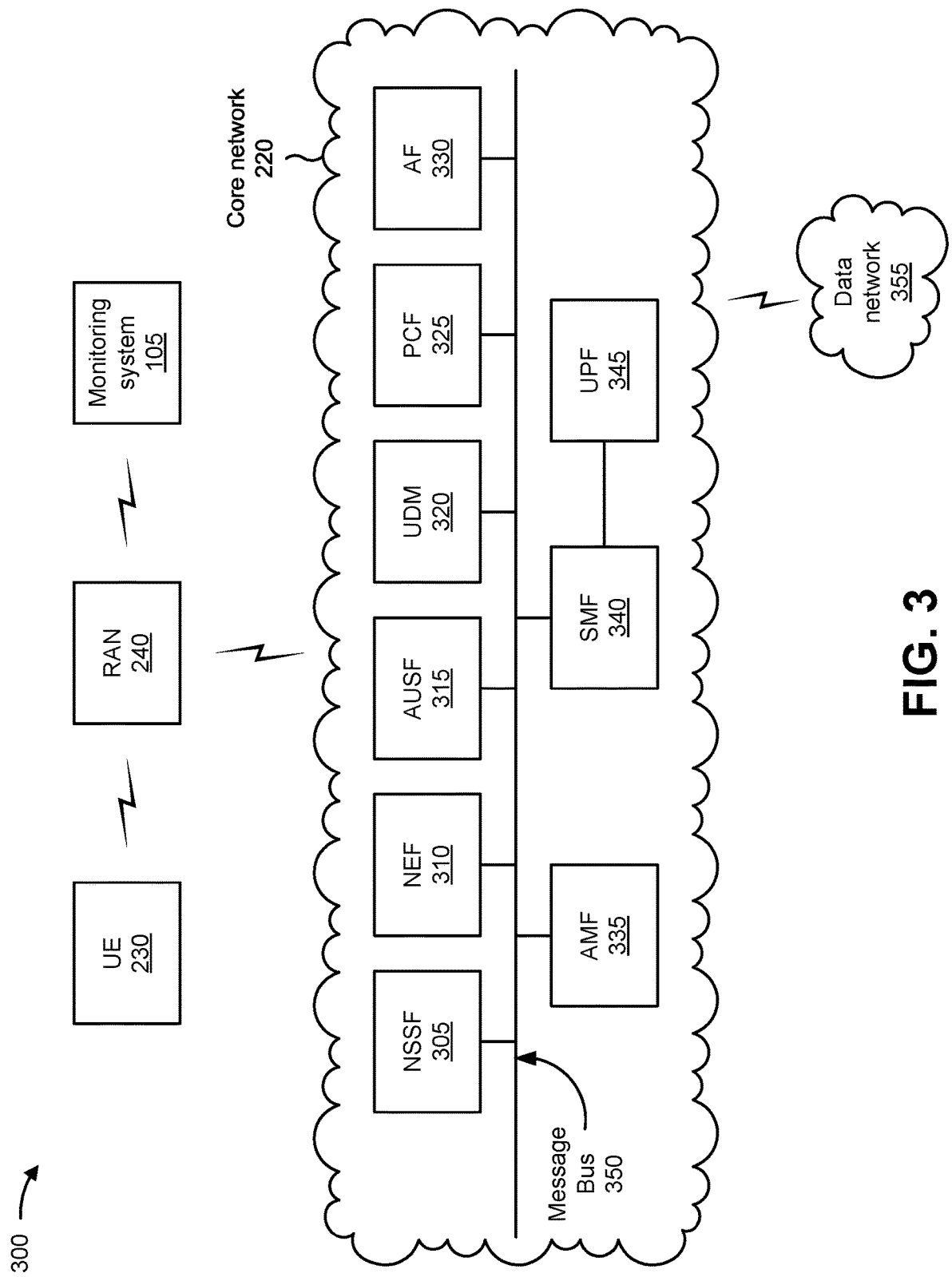

FIG. 3 is a diagram of an example environment 300 in which systems and/or methods described herein may be implemented. As shown in FIG. 3, the example environment 300 may include the monitoring system 105, the core network 220, the UE 230, the RAN 240, and a data network 355. Devices and/or networks of the example environment 300 may interconnect via wired connections, wireless connections, or a combination of wired and wireless connections.

The monitoring system 105, the UE 230, and the RAN 240 are described above in connection with FIG. 2. In some implementations, the core network 220 may include an example functional architecture in which systems and/or methods described herein may be implemented. For example, the core network 220 may include an example architecture of a 5G next generation (NG) core network included in a 5G wireless telecommunications system.

As shown in FIG. 3, the core network 220 may include a number of functional elements. The functional elements may include, for example, a network slice selection function (NSSF) 305, a network exposure function (NEF) 310, an authentication server function (AUSF) 315, a unified data management (UDM) component 320, a policy control function (PCF) 325, an application function (AF) 330, an access and mobility management function (AMF) 335, a session management function (SMF) 340, and/or a user plane function (UPF) 345 These functional elements may be communicatively connected via a message bus 350. Each of the functional elements shown in FIG. 3 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 305 includes one or more devices that select network slice and/or slice instances for the UE 230. By providing network slicing, the NSSF 305 and the AMF 335 allow an operator to deploy multiple substantially independent end-to-end networks potentially with the same infrastructure. In some implementations, each slice may be customized for different services.

The NEF 310 includes one or more devices that support exposure of capabilities and/or events in the wireless telecommunications system to help other entities in the wireless telecommunications system discover network services.

The AUSF 315 includes one or more devices that act as an authentication server and support the process of authenticating the UE 230 in the wireless telecommunications system.

The UDM 320 includes one or more devices that store user data and profiles in the wireless telecommunications system. The UDM 320 may be used for fixed access and/or mobile access in the core network 220.

The PCF 325 includes one or more devices that provide a policy framework that incorporates policy for network slicing, roaming, packet processing, and/or mobility management, among other examples.

The AF 330 includes one or more devices that support application influence on traffic routing, access to the NEF 310, and/or policy control, among other examples.

The AMF 335 includes one or more devices that act as a termination point for non-access stratum (NAS) signaling and/or mobility management, among other examples.

The SMF 340 includes one or more devices that support the establishment, modification, and release of communication sessions in the wireless telecommunications system. For example, the SMF 340 may configure traffic steering policies at the UPF 345 and/or may enforce UE Internet protocol (IP) address allocation and policies, among other examples.

The UPF 345 includes one or more devices that serve as an anchor point for intraRAT and/or interRAT mobility. The UPF 345 may apply rules to packets, such as rules pertaining to packet routing, traffic reporting, and/or handling user plane QoS, among other examples.

The message bus 350 represents a communication structure for communication among the functional elements. In other words, the message bus 350 may permit communication between two or more functional elements.

The data network 355 includes one or more wired and/or wireless data networks. For example, the data network 355 may include an IP Multimedia Subsystem (IMS), a PLMN, a LAN, a WAN, a metropolitan area network (MAN), a LADN, a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the example environment 300 may perform one or more functions described as being performed by another set of devices of the example environment 300.

Figure 4:
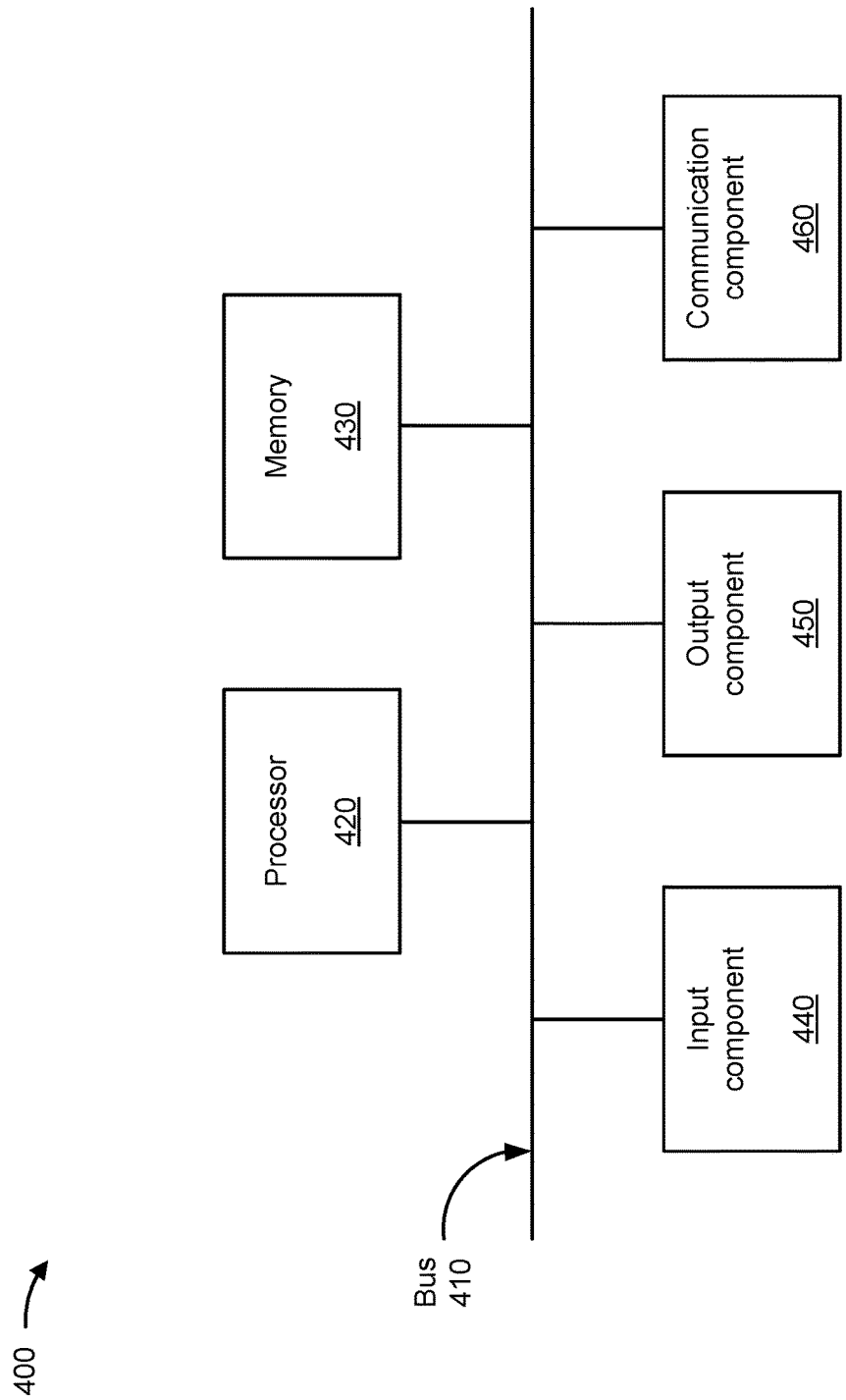
FIG. 4 is a diagram of example components of one or more devices of FIGS. 2 and 3.

FIG. 4 is a diagram of example components of a device 400, which may correspond to the monitoring system 105, the UE 230, the RAN 240, the NSSF 305, the NEF 310, the AUSF 315, the UDM 320, the PCF 325, the AF 330, the AMF 335, the SMF 340, and/or the UPF 345. In some implementations, the monitoring system 105, the UE 230, the RAN 240, the NSSF 305, the NEF 310, the AUSF 315, the UDM 320, the PCF 325, the AF 330, the ANT 335, the SMF 340, and/or the UPF 345 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. Memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hard-wired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
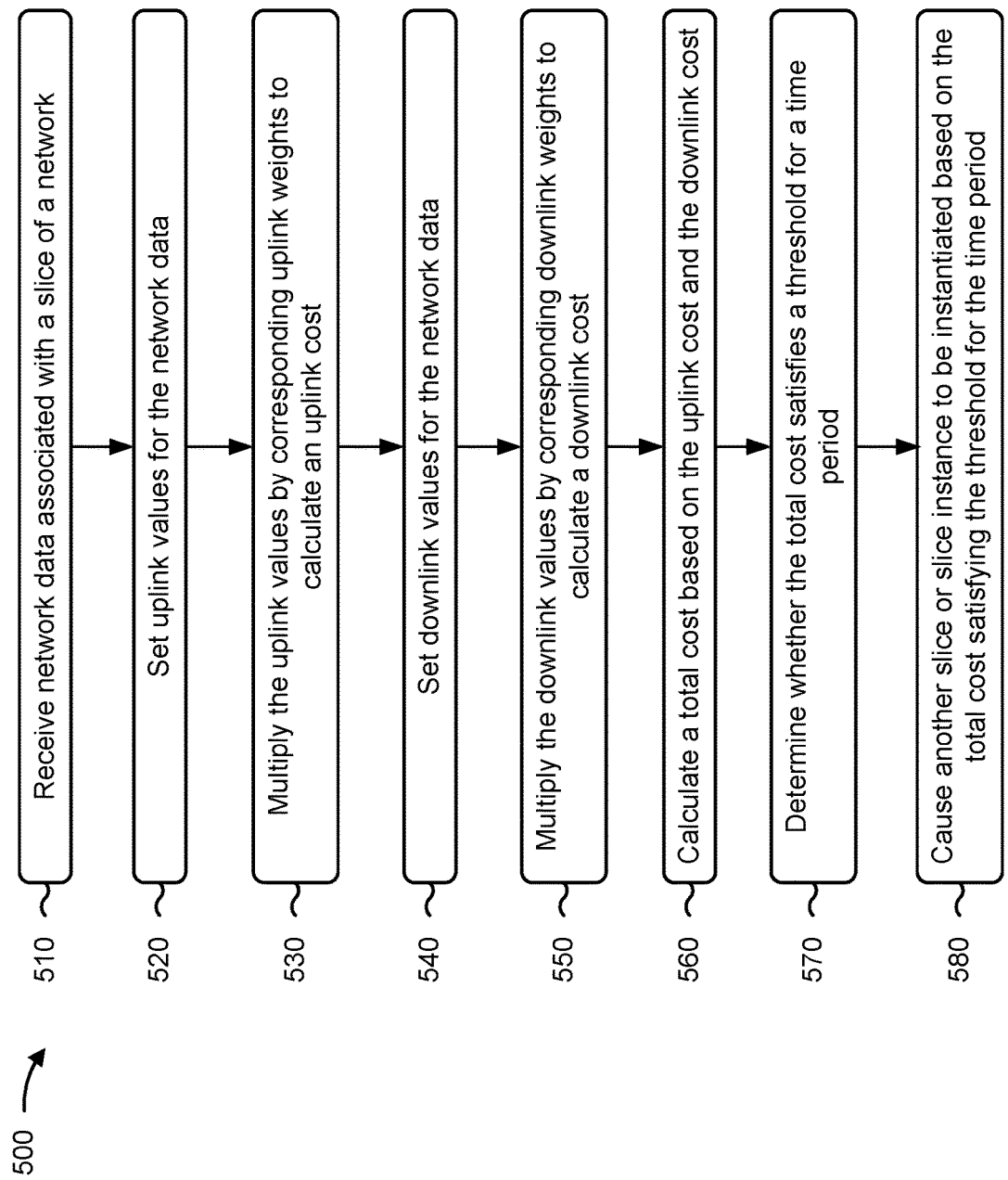
FIG. 5 is a flowchart of an example process for monitoring performance of a network slice and mitigating load on the network slice.

FIG. 5 is a flowchart of an example process 500 for monitoring performance of a network slice and mitigating load on the network slice. In some implementations, one or more process blocks of FIG. 5 may be performed by a device (e.g., the monitoring system 105). In some implementations, one or more process blocks of FIG. 5 may be performed by another device or a group of devices separate from or including the device, such as a UE (e.g., the UE 230). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving network data associated with a slice of a network (block 510). For example, the device may receive network data identifying uplink packet loss percentage, uplink jitter, uplink latency, uplink packet throughput, downlink packet loss percentage, downlink jitter, downlink latency, and downlink packet throughput associated with a slice of a network, as described above. In some implementations, the slice is provided in a radio access network and a core network.

As further shown in FIG. 5, process 500 may include setting uplinks value for the network data (block 520). For example, the device may set an uplink value for each of the uplink packet loss percentage, the uplink jitter, the uplink latency, and the uplink packet throughput to generate a plurality of uplink values, as described above. In some implementations, setting the uplink value for each of the uplink packet loss percentage, the uplink jitter, the uplink latency, and the uplink packet throughput to generate the plurality of uplink values includes setting a first uplink value for the uplink packet loss percentage, based on a first uplink threshold, setting a second uplink value for the uplink jitter, based on a second uplink threshold, setting a third uplink value for the uplink latency, based on a third uplink threshold, and setting a fourth uplink value for the uplink packet throughput, based on a fourth uplink threshold.

As further shown in FIG. 5, process 500 may include multiplying the uplink values by corresponding uplink weights to calculate an uplink cost (block 530). For example, the device may multiply the plurality of uplink values by corresponding uplink weights to calculate an uplink cost, as described above. In some implementations, multiplying the plurality of uplink values by the corresponding uplink weights to calculate the uplink cost includes multiplying the first uplink value by a first uplink weight to generate a first uplink cost, multiplying the second uplink value by a second uplink weight to generate a second uplink cost, multiplying the third uplink value by a third uplink weight to generate a third uplink cost, multiplying the fourth uplink value by a fourth uplink weight to generate a fourth uplink cost, and calculating the uplink cost based on the first uplink cost, the second uplink cost, the third uplink cost, and the fourth uplink cost.

As further shown in FIG. 5, process 500 may include setting downlink values for the network data (block 540). For example, the device may set a downlink value for each of the downlink packet loss percentage, the downlink jitter, the downlink latency, and the downlink packet throughput to generate a plurality of downlink values, as described above. In some implementations, setting the downlink value for each of the downlink packet loss percentage, the downlink jitter, the downlink latency, and the downlink packet throughput to generate the plurality of downlink values includes setting a first downlink value for the downlink packet loss percentage, based on a first downlink threshold, setting a second downlink value for the downlink jitter, based on a second downlink threshold, setting a third downlink value for the downlink latency, based on a third downlink threshold, and setting a fourth downlink value for the downlink packet throughput, based on a fourth downlink threshold.

As further shown in FIG. 5, process 500 may include multiplying the plurality of downlink values by corresponding downlink weights to calculate a downlink cost (block 550). For example, the device may multiply the plurality of downlink values by corresponding downlink weights to calculate a downlink cost, as described above. In some implementations, multiplying the plurality of downlink values by the corresponding downlink weights to calculate the downlink cost includes multiplying the first downlink value by a first downlink weight to generate a first downlink cost, multiplying the second downlink value by a second downlink weight to generate a second downlink cost, multiplying the third downlink value by a third downlink weight to generate a third downlink cost, multiplying the fourth downlink value by a fourth downlink weight to generate a fourth downlink cost, and calculating the downlink cost based on the first downlink cost, the second downlink cost, the third downlink cost, and the fourth downlink cost. In some implementations, each of the plurality of uplink values is zero or one, wherein the corresponding uplink weights sum to one, wherein each of the plurality of downlink values is zero or one, and wherein the corresponding downlink weights sum to one.

As further shown in FIG. 5, process 500 may include calculating a total cost based on the uplink cost and the downlink cost (block 560). For example, the device may calculate a total cost based on the uplink cost and the downlink cost, as described above. In some implementations, calculating the total cost based on the uplink cost and the downlink cost includes applying weights to the uplink cost and the downlink cost to generate a weighted uplink cost and a weighted downlink cost, and calculating the total cost based on the weighted uplink cost and the weighted downlink cost.

As further shown in FIG. 5, process 500 may include determining whether the total cost satisfies a threshold for a time period (block 570). For example, the device may determine whether the total cost satisfies a threshold for a time period, as described above. In some implementations, determining whether the total cost satisfies the threshold for the time period includes determining whether the total cost is less than the threshold for the time period.

As further shown in FIG. 5, process 500 may include causing another slice to be instantiated based on the total cost satisfying the threshold for the time period (block 580). For example, the device may cause another slice, with the same attributes as the slice, to be instantiated based on the total cost satisfying the threshold for the time period, as described above.

In some implementations, process 500 includes processing the plurality of uplink values and the corresponding uplink weights, with a machine learning model, to generate results that determine expected uplink values for a present time period or predicted uplink values for a future time period, and modifying one or more of the plurality of uplink values or the corresponding uplink weights based on the results.

In some implementations, process 500 includes processing the plurality of downlink values and the corresponding downlink weights, with a machine learning model, to generate results that determine expected downlink values for a present time period or predicted downlink values for a future time period, and modifying one or more of the plurality of downlink values or the corresponding downlink weights based on the results.

In some implementations, process 500 includes one or more of performing load balancing for the slice and the other slice, causing the network to switch a UE from the requested slice to a new slice based on the total cost satisfying the threshold for the time period, causing the network to reject a UE registration for the slice based on the total cost satisfying the threshold for the time period, or causing the network to switch a UE from the slice to a slice with less attributes as the slice based on the total cost satisfying the threshold for the time period. In some implementations, performing the load balancing for the slice and the other slice includes causing the network to include the other slice in a list of allowed and preferred slices that is to be provided to user equipment registering with the network.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   receiving, by a device, network data identifying uplink packet loss percentage, uplink jitter, uplink latency, uplink packet throughput, downlink packet loss percentage, downlink jitter, downlink latency, and downlink packet throughput associated with a slice of a network;
   setting, by the device, an uplink value for each of the uplink packet loss percentage, the uplink jitter, the uplink latency, and the uplink packet throughput to generate a plurality of uplink values;
   multiplying, by the device, the plurality of uplink values by corresponding uplink weights to calculate an uplink cost;
   setting, by the device, a downlink value for each of the downlink packet loss percentage, the downlink jitter, the downlink latency, and the downlink packet throughput to generate a plurality of downlink values;
   multiplying, by the device, the plurality of downlink values by corresponding downlink weights to calculate a downlink cost;
   calculating, by the device, a total cost based on the uplink cost and the downlink cost;
   determining, by the device, whether the total cost satisfies a threshold for a time period; and
   causing, by the device, another slice or a slice instance, with the same uplink packet loss percentage, uplink jitter, uplink latency, uplink packet throughput, downlink packet loss percentage, downlink jitter, downlink latency, and downlink packet throughput as the slice, to be instantiated based on the total cost satisfying the threshold for the time period.

2. The method of claim 1, wherein setting the uplink value for each of the uplink packet loss percentage, the uplink jitter, the uplink latency, and the uplink packet throughput to generate the plurality of uplink values comprises:
   setting a first uplink value for the uplink packet loss percentage, based on a first uplink threshold;
   setting a second uplink value for the uplink jitter, based on a second uplink threshold;
   setting a third uplink value for the uplink latency, based on a third uplink threshold; and
   setting a fourth uplink value for the uplink packet throughput, based on a fourth uplink threshold.

3. The method of claim 2, wherein multiplying the plurality of uplink values by the corresponding uplink weights to calculate the uplink cost comprises:
multiplying the first uplink value by a first uplink weight to generate a first uplink cost;
multiplying the second uplink value by a second uplink weight to generate a second uplink cost;
multiplying the third uplink value by a third uplink weight to generate a third uplink cost;
multiplying the fourth uplink value by a fourth uplink weight to generate a fourth uplink cost; and
calculating the uplink cost based on the first uplink cost, the second uplink cost, the third uplink cost, and the fourth uplink cost.

4. The method of claim 1, wherein setting the downlink value for each of the downlink packet loss percentage, the downlink jitter, the downlink latency, and the downlink packet throughput to generate the plurality of downlink values comprises:
setting a first downlink value for the downlink packet loss percentage, based on a first downlink threshold;
setting a second downlink value for the downlink jitter, based on a second downlink threshold;
setting a third downlink value for the downlink latency, based on a third downlink threshold; and
setting a fourth downlink value for the downlink packet throughput, based on a fourth downlink threshold.

5. The method of claim 4, wherein multiplying the plurality of downlink values by the corresponding downlink weights to calculate the downlink cost comprises:
multiplying the first downlink value by a first downlink weight to generate a first downlink cost;
multiplying the second downlink value by a second downlink weight to generate a second downlink cost;
multiplying the third downlink value by a third downlink weight to generate a third downlink cost;
multiplying the fourth downlink value by a fourth downlink weight to generate a fourth downlink cost; and
calculating the downlink cost based on the first downlink cost, the second downlink cost, the third downlink cost, and the fourth downlink cost.

6. The method of claim 1, wherein calculating the total cost based on the uplink cost and the downlink cost comprises:
applying weights to the uplink cost and the downlink cost to generate a weighted uplink cost and a weighted downlink cost; and
calculating the total cost based on the weighted uplink cost and the weighted downlink cost.

7. The method of claim 1, further comprising:
processing the plurality of uplink values and the corresponding uplink weights, with a machine learning model, to generate results that determine expected uplink values for a present time period or predicted downlink values for a future time period; and
modifying one or more of the plurality of uplink values or the corresponding uplink weights based on the results.

8. A device, comprising:
one or more processors configured to:
receive network data identifying uplink packet loss percentage, uplink jitter, uplink latency, uplink packet throughput, downlink packet loss percentage, downlink jitter, downlink latency, and downlink packet throughput associated with a slice of a network;
set an uplink value for each of the uplink packet loss percentage, the uplink jitter, the uplink latency, and the uplink packet throughput to generate a plurality of uplink values;
multiply the plurality of uplink values by corresponding uplink weights to calculate an uplink cost;
set a downlink value for each of the downlink packet loss percentage, the downlink jitter, the downlink latency, and the downlink packet throughput to generate a plurality of downlink values;
multiply the plurality of downlink values by corresponding downlink weights to calculate a downlink cost;
apply weights to the uplink cost and the downlink cost to generate a weighted uplink cost and a weighted downlink cost;
calculate a total cost based on the weighted uplink cost and the weighted downlink cost;
determine whether the total cost satisfies a threshold for a time period; and
cause another slice, with the same uplink packet loss percentage, uplink jitter, uplink latency, uplink packet throughput, downlink packet loss percentage, downlink jitter, downlink latency, and downlink packet throughput as the slice, to be instantiated based on the total cost satisfying the threshold for the time period.

9. The device of claim 8, wherein the one or more processors are further configured to:
process the plurality of downlink values and the corresponding downlink weights, with a machine learning model, to generate results; and
modify one or more of the plurality of downlink values or the corresponding downlink weights based on the results.

10. The device of claim 8, wherein each of the plurality of uplink values is zero or one,
wherein the corresponding uplink weights sum to one,
wherein each of the plurality of downlink values is zero or one, and
wherein the corresponding downlink weights sum to one.

11. The device of claim 8, wherein the one or more processors are further configured to one or more of:
perform load balancing for the slice and the other slice;
cause the network to switch a user equipment from the slice to a new slice based on the total cost satisfying the threshold for the time period;
cause the network to reject a user equipment registration for the slice based on the total cost satisfying the threshold for the time period; or
cause the network to switch a user equipment from the slice to a slice with less attributes as the slice based on the total cost satisfying the threshold for the time period.

12. The device of claim 11, wherein the one or more processors, to perform the load balancing for the slice and the other slice, are configured to:
cause the network to include the other slice in a list of preferred slices that is to be provided to user equipment registering with the network.

13. The device of claim 8, wherein the one or more processors, to determine whether the total cost satisfies the threshold for the time period, are configured to:
determine whether the total cost is less than the threshold for the time period.

14. The device of claim 8, wherein the slice is provided in a radio access network and a core network.

15. A non-transitory computer-readable medium storing a set of instructions, the set of instructions comprising:
one or more instructions that, when executed by one or more processors of a device, cause the device to:
receive network data identifying uplink packet loss percentage, uplink jitter, uplink latency, uplink packet throughput, downlink packet loss percentage, downlink jitter, downlink latency, and downlink packet throughput associated with a slice of a network;
set an uplink value for each of the uplink packet loss percentage, the uplink jitter, the uplink latency, and the uplink packet throughput to generate a plurality of uplink values;
multiply the plurality of uplink values by corresponding uplink weights to calculate an uplink cost;
set a downlink value for each of the downlink packet loss percentage, the downlink jitter, the downlink latency, and the downlink packet throughput to generate a plurality of downlink values;
multiply the plurality of downlink values by corresponding downlink weights to calculate a downlink cost;
calculate a total cost based on the uplink cost and the downlink cost;
determine whether the total cost satisfies a threshold for a time period; and
cause a user equipment to switch to another slice, with the same uplink packet loss percentage, uplink jitter, uplink latency, uplink packet throughput, downlink packet loss percentage, downlink jitter, downlink latency, and downlink packet throughput as the slice, based on the total cost satisfying the threshold for the time period.

16. The non-transitory computer-readable medium of claim 15, wherein the one or more instructions, that cause the device to set the uplink value for each of the uplink packet loss percentage, the uplink jitter, the uplink latency, and the uplink packet throughput to generate the plurality of uplink values, cause the device to:
set a first uplink value for the uplink packet loss percentage, based on a first uplink threshold;
set a second uplink value for the uplink jitter, based on a second uplink threshold;
set a third uplink value for the uplink latency, based on a third uplink threshold; and
set a fourth uplink value for the uplink packet throughput, based on a fourth uplink threshold.

17. The non-transitory computer-readable medium of claim 16, wherein the one or more instructions, that cause the device to multiply the plurality of uplink values by the corresponding uplink weights to calculate the uplink cost, cause the device to:
multiply the first uplink value by a first uplink weight to generate a first uplink cost;
multiply the second uplink value by a second uplink weight to generate a second uplink cost;
multiply the third uplink value by a third uplink weight to generate a third uplink cost;
multiply the fourth uplink value by a fourth uplink weight to generate a fourth uplink cost; and
calculate the uplink cost based on the first uplink cost, the second uplink cost, the third uplink cost, and the fourth uplink cost.

18. The non-transitory computer-readable medium of claim 15, wherein the one or more instructions, that cause the device to set the downlink value for each of the downlink packet loss percentage, the downlink jitter, the downlink latency, and the downlink packet throughput to generate the plurality of downlink values, cause the device to:
set a first downlink value for the downlink packet loss percentage, based on a first downlink threshold;
set a second downlink value for the downlink jitter, based on a second downlink threshold;
set a third downlink value for the downlink latency, based on a third downlink threshold;
and set a fourth downlink value for the downlink packet throughput, based on a fourth downlink threshold.

19. The non-transitory computer-readable medium of claim 18, wherein the one or more instructions, that cause the device to multiply the plurality of downlink values by the corresponding downlink weights to calculate the downlink cost, cause the device to:
multiply the first downlink value by a first downlink weight to generate a first downlink cost;
multiply the second downlink value by a second downlink weight to generate a second downlink cost;
multiply the third downlink value by a third downlink weight to generate a third downlink cost;
multiply the fourth downlink value by a fourth downlink weight to generate a fourth downlink cost; and
calculate the downlink cost based on the first downlink cost, the second downlink cost, the third downlink cost, and the fourth downlink cost.

20. The non-transitory computer-readable medium of claim 15, wherein the one or more instructions further cause the device to:
process the plurality of uplink values, the corresponding uplink weights, the plurality of downlink values, and the corresponding downlink weights with a machine learning model, to generate results that determine expected uplink values for a present time period or predicted uplink values for a future time period; and
modify one or more of the plurality of uplink values, the corresponding uplink weights, the plurality of downlink values, or the corresponding downlink weights based on the results.

* * * * *